(12) United States Patent
Egan et al.

(10) Patent No.: US 8,386,396 B2
(45) Date of Patent: Feb. 26, 2013

(54) SYSTEMS AND METHODS FOR BIDIRECTIONAL MATCHING

(75) Inventors: John Vincent Egan, Manly (AU); Kenneth Ian McDonald, Mosma (AU)

(73) Assignee: EXM Services International Pty Limited, Sydney (AU)

(*) Notice: Subject to any disclaimer, the term of this patent is extended or adjusted under 35 U.S.C. 154(b) by 613 days.

(21) Appl. No.: 12/467,413

(22) Filed: May 18, 2009

(65) Prior Publication Data

US 2009/0287695 A1 Nov. 19, 2009

(30) Foreign Application Priority Data

May 19, 2008 (AU) ................................ 2008902475

(51) Int. Cl.
*G06Q 99/00* (2006.01)
(52) U.S. Cl. ........................................ 705/319
(58) Field of Classification Search .................. 705/319
See application file for complete search history.

(56) References Cited

U.S. PATENT DOCUMENTS

| | | | |
|---|---|---|---|
| 6,289,340 B1 * | 9/2001 | Puram et al. ................ 705/7.14 |
| 7,676,466 B2 * | 3/2010 | Terrill et al. ........... 707/999.006 |
| 7,761,386 B2 * | 7/2010 | Teicher ......................... 705/319 |
| 7,769,699 B2 * | 8/2010 | Teicher ......................... 705/319 |
| 7,945,522 B2 * | 5/2011 | McGovern et al. ........... 705/320 |
| 8,001,056 B2 * | 8/2011 | Tesler et al. .................... 705/319 |
| 8,150,416 B2 * | 4/2012 | Ribaudo et al. ........... 455/456.1 |
| 8,195,668 B2 * | 6/2012 | Drennan et al. .............. 707/748 |
| 2005/0131716 A1 * | 6/2005 | Hanan et al. ...................... 705/1 |
| 2006/0031087 A1 * | 2/2006 | Fox et al. .......................... 705/1 |
| 2006/0277056 A1 * | 12/2006 | Broberg ............................ 705/1 |

OTHER PUBLICATIONS

Houts, Reate M; Robins, Elliot; Huston, Ted L. Compatibility and the development of premarital relationships. Journal of Marriage and the Family; Feb. 1996; 58, 1; ProQuest Central peg. 7.*
Minkov, Elnat. Adaptive Graph Walk Based Similarity Measures in Entity-Relation Graphs. Carnegie Mellon University, 2008. 3480166.*

* cited by examiner

*Primary Examiner* — Jonathan Ouellette
*Assistant Examiner* — Amanda Kirlin
(74) *Attorney, Agent, or Firm* — Pearl Cohen Zedek Latzer, LLP

(57) ABSTRACT

Described herein are systems and methods for bidirectional matching. In overview, various embodiments provide software, hardware and methodologies underlying a bidirectional matching approach that implements a multi-level importance weighting procedure. Generally speaking, potential relationships between parties are scored on the basis of criterion matches. In some embodiments, a value is assigned to each criterion match based on a function of predefined factor, which is optionally experientially defined, and a further factor, which is defined based on individual preferences.

17 Claims, 7 Drawing Sheets

| Match Criterion | Match | Weight | Investor Adj | Investee Adj | Match Score |
|---|---|---|---|---|---|
| Industry | True | 20 | 30.00 | 20.00 | |
| Location | True | 20 | 40.00 | 20.00 | |
| Investment Amount | True | 10 | 20.00 | 10.00 | |
| Investment Timeframe | False | 10 | 15.00 | 10.00 | |
| Competitive Advantage | True | 5 | 5.00 | 5.00 | |
| Debt Finance | False | 5 | 0.00 | 5.00 | |
| Intellectual Property | False | 5 | 2.50 | 5.00 | |
| Investment Stage | True | 5 | 7.50 | 5.00 | |
| Exit Strategy | True | 4 | 0.00 | 4.00 | |
| Involvement | False | 4 | 4.00 | 8.00 | |
| Ownership | False | 4 | 8.00 | 4.00 | |
| Legal Entity | True | 4 | 4.00 | 0.00 | |
| Purpose | True | 4 | 0.00 | 4.00 | |
| Total | True | 100 | 106.50 | 68.00 | |
| % | True | 100 | 78.31 | 68.00 | 73.16 |

FIG. 5

SYSTEMS AND METHODS FOR BIDIRECTIONAL MATCHING

CROSS-REFERENCE TO RELATED APPLICATIONS

This application claims priority from Australian Provisional Application No. 2008902475, filed May 19, 2008, which is here by incorporated by reference.

FIELD OF THE INVENTION

The present invention relates to systems and methods for bidirectional matching, and more particularly to computer implemented technologies for allowing weighting of various criteria thereby to match members of a first group with members of a second group.

Embodiments of the invention have been particularly developed for facilitating the matching of parties seeking investment opportunities with parties seeking investment sources. While some embodiments will be described herein with particular reference to that application, it will be appreciated that the invention is not limited to such a field of use, and is applicable in broader contexts. For example, underlying methodologies, including matching techniques, are equally applicable to the interfacing of parties in other environments, examples of which include applications such as property leasing, relationship matchmaking, and so on.

BACKGROUND

Any discussion of the background art throughout the specification should in no way be considered as an admission that such art is widely known or forms part of common general knowledge in the field.

It is known to make use of a computer system to perform a search based on a set of criteria. Indeed, such a concept is central to substantially all searching technologies. In broad terms, a searcher provides a query based on one or more criteria, such as keywords and/or qualitative identifiers, and is provided with none or more results in response to the query.

In terms of interfacing parties, the traditional approach is for a first party to provide a set of criteria, and for a search engine to identify none or more parties meeting that set of criteria. For example, a person wishing to purchase a used car provides search criteria (such a price range, make, model, and the like), and the search engine identifies one or more records reflective of used cars posted by persons wishing to sell used cars. For the present purposes, this is referred to as "unidirectional matching", as only the interests of one party are considered (in this case being the party wishing to purchase a used car).

Unidirectional matching is not always appropriate for interfacing parties. Although it is typically suitable for situations where one party has criteria that should be satisfied and the other party is generally impartial (as is the case in most buyer/seller environments), there are situations where both parties have criteria that should be satisfied. This becomes relevant in situations where, although a first party might match criteria provided by a second party, the second party might not match criteria provided by the first party. This leads to a concept referred to herein as "bidirectional matching". By way of bidirectional matching, two (or optionally more) parties are matched based on mutual satisfaction of specified criteria.

Bidirectional matching is conceptually and technologically challenging, and known approaches are relatively rudimentary in nature. It follows that there is a need for improved systems and methods for interfacing parties.

SUMMARY OF THE INVENTION

It is an object of the present invention to overcome or ameliorate at least one of the disadvantages of the prior art, or to provide a useful alternative.

One embodiment provides a method for bidirectional matching between parties belonging to a first group and parties belonging to a second group, the method including the steps of:

(a) collecting from the parties data indicative of criterion responses for a plurality of criterions, wherein each criterion has a pre-assigned baseline rating score;

(b) in respect of at least a selection of the criterion responses, determining preferential rating scores;

(c) on the basis of a criterion match determination protocol, processing the data indicative of criterion responses, thereby to identify criterion matches between parties belonging to the first group and parties belonging to the second group; and (d) determining, for each criterion match, a criterion match rating based on a function of the baseline rating score and, where determined, the preferential rating score or scores.

One embodiment provides a method for bidirectional matching between parties belonging to a first group and parties belonging to a second group, the method including:

(a) defining a decision set including a plurality of criterions;

(b) for each criterion in the set, defining a baseline rating score;

(c) receiving, from each party, data indicative of criterion responses for each criterion in the set wherein at least a selection of the criterion responses include data indicative of an importance indicator;

(d) processing the data indicative of importance indicators thereby to define preferential rating scores;

(e) on the basis of a criterion match determination protocol, processing the data indicative of criterion responses, thereby to identify criterion matches between parties belonging to the first group and parties belonging to the second group;

(f) for each identified criterion match between a party belonging to the first group and a party belonging to the second group, calculating a criterion match score based on a function of the baseline rating score and, where defined, the preferential rating score or scores for those parties; and (g) on the basis of the scoring of criterion matches, ranking party-to-party matches between a given member of the first group and a plurality of members of the second group.

One embodiment provides a method for information gathering thereby to allow bidirectional matching between parties belonging to a first group and parties belonging to a second group, the method including the steps of:

(b) presenting, to a first party, an interface for collecting data indicative of criterion responses for a plurality of criterions, wherein each criterion has an assigned baseline rating score;

(c) receiving, from the first party, data indicative of the criterion responses for the plurality of criterions;

(d) receiving, from the first party, in respect of at least one criterion response, data indicative of an importance indicator;

(e) processing each received importance indicator thereby to define preferential rating scores for the relevant criterion responses, wherein the matching includes calculating a criterion match score based on a function of the baseline rating score and, where defined, the preferential rating score.

One embodiment provides a searching method including the steps of.
(a) receiving data indicative of a plurality of search terms;
(b) assigning to each search term a baseline rating score;
(c) in respect of at least one search term, determining a preferential rating score;
(d) on the basis of a result identification protocol, processing the data indicative of search terms, thereby to identify search results; and
(e) determining, for each search result, a result rating based on a function of the baseline rating score and the preferential rating scores.

One embodiment provides a computer system including a processor configured to perform a method as described herein.

One embodiment provides a computer program product configured to perform a method as described herein.

One embodiment provides a computer readable medium carrying a set of instructions that when executed by one or more processors cause the one or more processors to perform a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being necessarily limited to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which:

FIG. 5 shows an exemplary match report according to one embodiment.

DETAILED DESCRIPTION

Described herein are systems and methods for bidirectional matching. In overview, various embodiments provide software, hardware and/or methodologies underlying a bidirectional matching approach that implements a multi-level importance weighting procedure. Generally speaking, potential relationships between parties are scored on the basis of criterion matches. In some embodiments, a value is assigned to each criterion match based on a function of a predefined factor, which is optionally experientially defined, and a further factor, which is defined based on individual preferences.

Method Overview

Figure 1A:
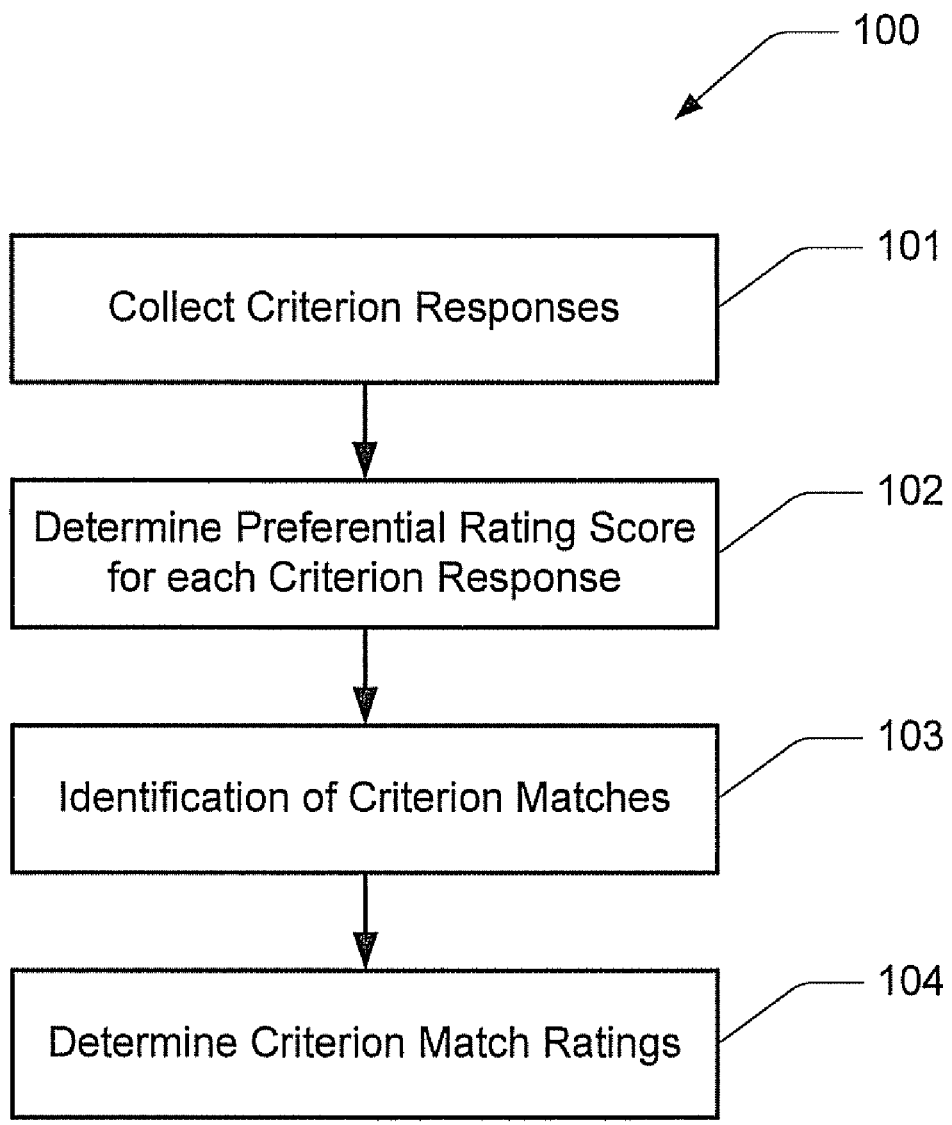
FIG. 1A is a schematic representation of a method according to one embodiment.

FIG. 1A illustrates a method 100 for bidirectional matching according to one embodiment. This bidirectional matching occurs between parties belonging to a first group, and parties belonging to a second group. For example, in one embodiment, the parties belonging to the first group are investors seeking investment opportunities, whereas the parties belonging to the second group are seeking out investors. In another embodiment, the parties belonging to the first group are property owners seeking renters, whereas the parties belonging to the second group are renters seeking out rental properties. Further embodiments find application in various other contexts, including the likes of relationship matchmaking, and the general concepts should not be necessarily limited to any particular application.

Generally speaking, the present methodologies are appropriate in substantially any context where parties belonging to a first group have respective desires, and parties belonging to a second group have their own respective desires, with a mutual overriding desire for both groups being to identify potential matches in the opposed group. An appropriate matching between a first party belonging to the first group and a second party belonging to the second group is contingent on the first party adequately meeting the second party's desires and the second party adequately meeting the first party's desires. Of course, adequacy is a somewhat subjective notion. Various aspects of the present technology are directed towards objectively scoring the adequacy of a match.

Step 101 includes collecting, from the parties, data indicative of criterion responses for a plurality of criterions. As discussed further below, the present method operates in a context where a decision set is defined, the set including a plurality of criterions. Each criterion optionally has one or more respective sub-criterions. Each criterion also has a pre-assigned baseline rating score which, in some embodiments, is experientially defined based on the relative perceived importance of each criterion in terms of the market and/or groups under consideration.

In the context of the present disclosure, the term "criterions' is used as a plural of criterion" as opposed to the more conventional plural form "criteria". This is for the sake of convenient explanation only, and the terms "criterions" and "criteria" should both be regarded as synonymous.

Step 102 includes, in respect of at least a selection of the criterion responses, determining preferential rating scores. The manner in which this occurs varies between embodiments, and some examples are considered further below. In overview, in some embodiments parties provide an indication of the personally perceived importance of each criterion on a relative basis. For example, a given party rates one criterion as being of relatively high importance and another criterion as being of relatively low importance.

As noted, step 102 includes determining preferential rating scores in respect of at least a selection of the criterion responses. This should be read broadly enough to include at least the following situations:

- Where preferential rating scores are defined in relation to one or more criterions, but only for criterion responses from parties belonging to the first group.
- Where preferential rating scores are defined in relation to one or more criterions, but only for criterion responses from parties belonging to the second group.
- Where preferential rating scores are defined in relation to one or more criterions, for criterion responses from parties belonging either group.
- A combination of the previous scenarios.
- Where preferential rating scores are defined for all criterion responses.

In general terms, it will be apparent where preferential rating scores are suitable. In some cases, a particular criterion elicits different forms of criterion responses from the two groups. For example, for one group the responses are factual (attributes), and it is not appropriate for a preferential rating score to be defined. On the other hand, for the other group, the responses are preferential (desires), and describe preferred attributes. A preferential rating score is appropriate to better objectify the subjective characteristics of such desires.

Step 103 includes processing the data indicative of criterion responses on the basis of a criterion match determination protocol. This allows for the identification of criterion matches between parties belonging to the first group and parties belonging to the second group. The manner by which a match determination protocol operates is discussed in more detail further below.

Step 104 includes determining, for each criterion match, a criterion match rating based on a function of the baseline rating score and, where available, the preferential rating scores. Again, this is dealt with in more detail further below, However, as an overview, in some embodiments this allows an experientially based understanding of criterion importance to be supplemented with personal preferences of both parties to a match, thereby providing a more accurate customized bidirectional matching functionality. It will be appreciated that, depending on the particular criterion, the match rating might be based on no preferential rating scores (for a criterion where a preferential rating score is not defined for any party), a single preferential rating score (for a criterion where a preferential rating score is only defined for parties belonging to the first group, or only defined for parties belonging to the second group) or multiple preferential raring scores (for example for a criterion where preferential rating scores are defined for all parties).

Figure 1B:
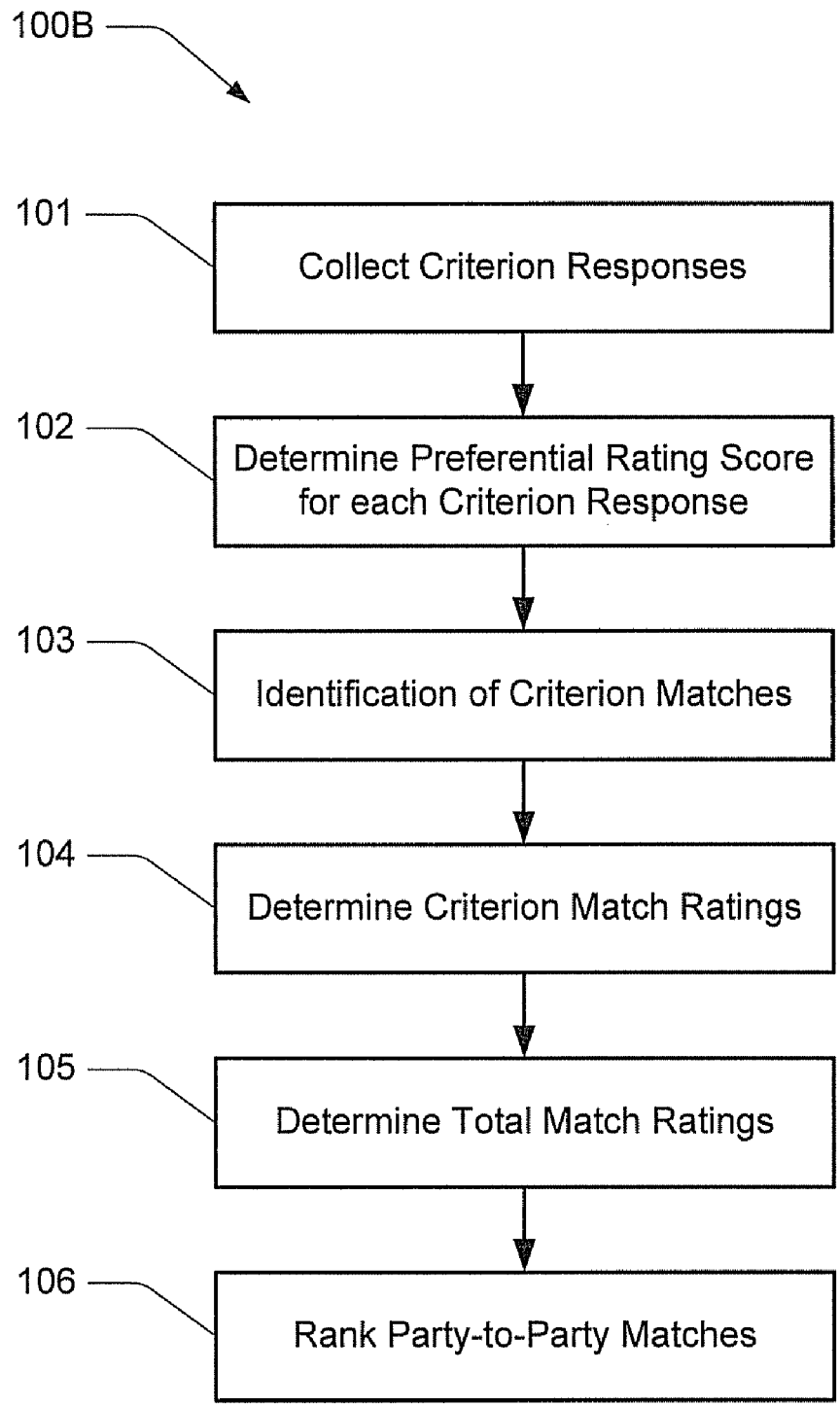
FIG. 1B is a schematic representation of a method according to one embodiment.

Various embodiments extend this general method to allow the ranking of party-to-party matches on the basis of criterion match ratings. For example, method 100B of FIG. 1B includes, at step 105, for each combination of a party belonging to the first group and a party belonging to the second group, defining a total match rating based on one or more identified criterion match ratings between that combination of parties. For example, criterion match ratings for each criterion match between a pair of parties are summed to derive a total match rating. Step 106 subsequently includes ranking party-to-party matches on the basis of the total match ratings.

The term "part" is used in a descriptive sense. In some embodiments, a given physical person or entity is represented by multiple "parties" in the context of a bidirectional matching environment (for example, one party seeking out a rental property, and another party seeking out a tenant for a rental property, or two parties seeking out tenants for respective rental properties). In this sense, an individual "party" is associated with a single set of criterion responses. In other embodiments, there is a one-to-one relationship between physical persons (or entities) and "parties", and each party is able to be matched on the basis of multiple sets of criterion responses (for example one set of criterion responses describing a desire to locate a rental property, and another set of criterion responses describing a desire to locate tenants for a rental property). In some embodiments, each physical person or entity maintains a profile for managing multiple sets of criterion responses, and in effect multiple "matchable" identities.

Initial Configuration

The bidirectional matching methods, systems, and functionalities described herein are, in practical terms, implemented in the context of a bidirectional matching model. Such a model requires initial configuration to suit the particular circumstances in which it operates.

Figure 2:
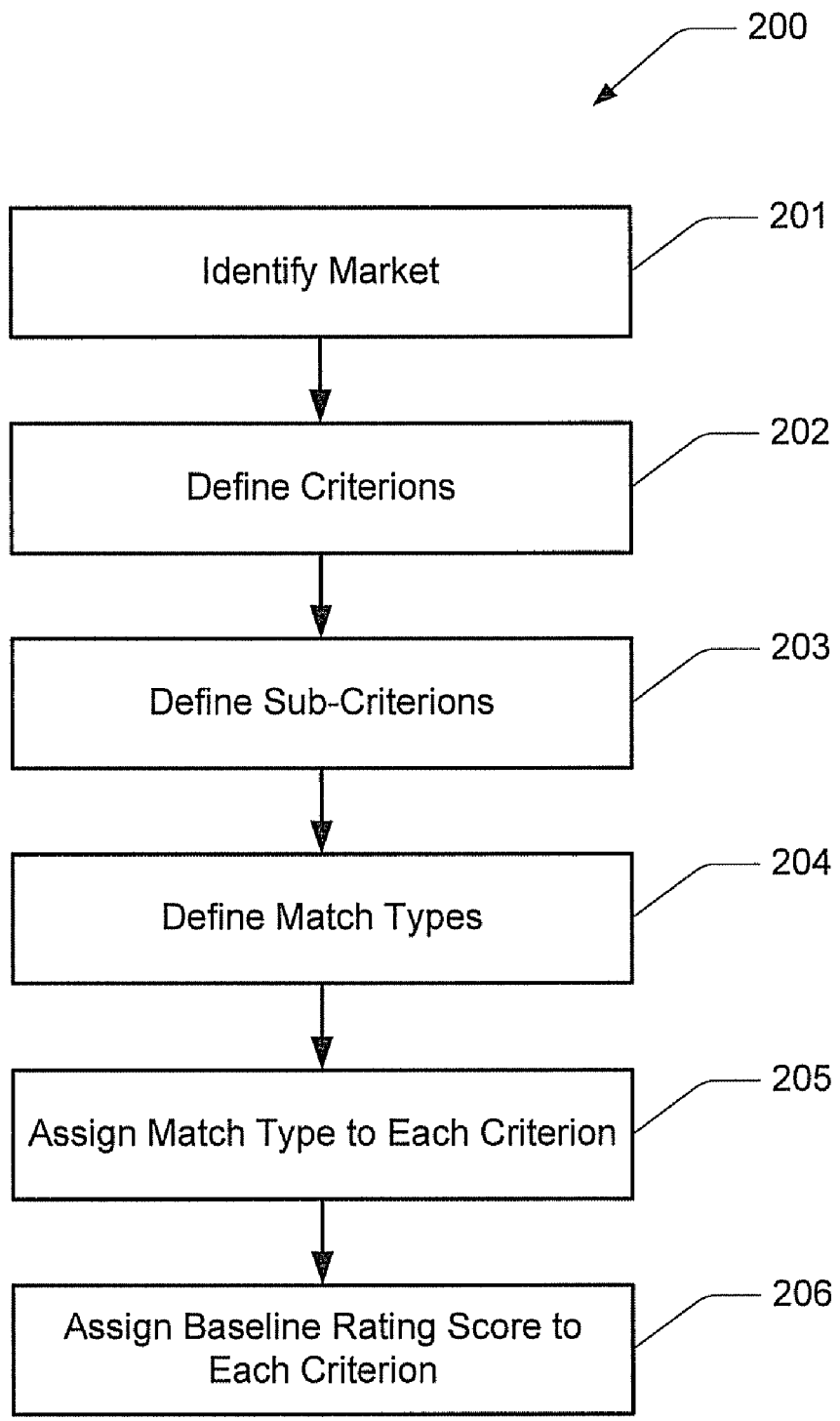
FIG. 2 is a schematic representation of a method according to one embodiment.

FIG. 2 illustrates a method 200 for performing initial configuration. It will be appreciated that the ordering of steps within this method varies between embodiments.

Step 201 includes identifying a bidirectional matching market. This essentially describes the field in which matching is to occur. Markets which may include, by way of example, investment, residential leases, personal relationships, or the like. In some embodiments common infrastructure is used for the purpose of multiple markets. However, irrespective of this, each market is defined by at least two groups of parties.

Step 202 includes defining, for the market, a plurality of criterions, these defining a decision set. The decision set effectively describes the union of desires/requirements between the first and second groups. So as to provide a simple example, in the context of a residential leasing market, criterions may include location, rental costs, term of lease, permission for pets, number of bedrooms and the like.

Step 203 includes defining sub-criterions. It is not essential for a given criterion to have multiple sub-criterions, although in various situations there are advantages with such an approach. For example, continuing with the residential leasing example commenced above, a criterion for location might not require multiple sub-criterions, as there is a single location. However, a criterion for "animals" might include sub-criterions such as "dogs", "cats", "birds", "fish" and other categories of animal. This might become relevant in a situation where, for example, a property owner permits a tenant to keep a bird but not a cat.

As context parties provide a criterion response in relation to each criterion, data indicative of such responses being collected at step 101. Criterion responses may take the form of desires or attributes. For example, in the context of desires, a criterion response describes what a party seeks in the context of that criterion. For example, in a residential leasing environment, a renter might desire a three-bedroom penthouse apartment in a particular location. A property owner might desire a working couple with no children and no pets. In the context of attributes, a criterion response describes an attribute of the relevant party. For example, in a residential leasing environment, a property owner might have a three-bedroom penthouse apartment in a particular location. A renter might represent a working couple with no children and no pets. In such situations attributes are matched to desires (or vice versa). However, in other situations desires are matched with desires (i.e. where parties have complementary desires). For example, in the context of an investment environment, a first party might desire an investor to become involved as a non-executive director, whilst a second party desires an opportunity to become involved with a business as a non-executive director. The difference between attributes and desires is generally not identifiable in a value describing a criterion response. Rather, the difference is drawn out in a prompt used to elicit a criterion response from a party.

Step 204 includes defining a set of match types. A match type defines how two criterion responses will be matched. For example, consider the case of two criterion responses "x" and "y" to a criterion having no sub-criterions. A simplistic view is that a match would exist in the situation where x=y. However, depending on the nature of the relevant criterion, a match could exist in the case of $x \geq y$ or $x \leq y$. For a criterion having multiple sub-criterions, there may be a need to match a single criterion response with multiple sub-criterion responses. This is relevant where a criterion response for Party A can only have one value (out of a possible set), but Party B may choose to accept any one of a number of values. For example Party A can either be male or female as an attribute, but not both. Party B could have a desire of male or female. A further general case exists when it is required to match multiple sub-criterions from Party A with multiple sub-criterions from Party B. Depending on market requirements, a match condition for the criterion could exist if:

At least one sub-criterion from Party A matches one sub-criterion from Party B.

At least 'm' sub-criterions from Party A matches 'm' sub-criterions from Party B where m>1.

Another general case arises where a criterion response from one party is contained within the criterion response of the other. For example, consider the case of a location. If we assume that Party A provides a criterion response indicative of 'London' and Party B provides a criterion response indicative of 'Europe', a match condition would exist if the match type specified "A contained in B".

A list of possible match types is shown in the following table. This list identified match types numerically, for the sake of reference in later examples. Furthermore, it should be appreciated that other embodiments make use of a greater or lesser number of match types.

Table of Possible Match types

| Match Type | Description | Example |
|---|---|---|
| 1 | Single/single | x = y |
| 2 | Single/single | x >= y |
| 3 | Single/single | x <= y |
| 4 | Single/multi any match | x = (x, y, z . . . ) |
| 5 | multi/single any match | ( . . . x, y, z . . . ) = x |
| 6 | Multi/multi any match | ( . . . x, y, z . . . ) = ( . . . x, y, z . . . ) |
| 7 | A contained in B | Paris contained in France |
| 8 | B contained in A | France contained in Europe |

Step 205 includes assigning a match type to each criterion defined at step 202. This forms the basis of a criterion match determination protocol. In the present example such a protocol considers a pair of criterion responses (from parties belonging to opposed groups) in respect of a given criterion, and determines whether a match is to be identified on the basis of the match type assigned for the relevant criterion.

The following table provides an example of how criterions are assigned to match types:

Assignment of Match Types to Criterions

| Criterion | Match type |
|---|---|
| Criterion 1 | 7 |
| Criterion 2 | 4 |
| . | . |
| Criterion 'n' | . |

In the above example, a match is found in respect of criterion 1 where a pair of criterion responses "x" and "y" (from parties belonging to opposed groups) satisfy the relationship x=y.

Step 206 includes assigning a baseline rating score to each criterion. This effectively defines a default relative weighting that is to be applied to each criterion. For example, in some embodiments these are defined experientially on the basis of market knowledge. In some embodiments baseline rating scores are dynamically adjusted over time, as discussed in the section below entitled "dynamic adjustment of baseline ratings".

The general notion underlying the use of a baseline rating score is to allow weighting between criterions based on an understanding of the relative importance of factors within the relevant market. For example, in a residential leasing market, experiential knowledge may indicate that location is of particular relative importance, and a relatively higher baseline rating score is therefore assigned.

As noted, baseline rating scores are relative between criterions. As such, regardless of individual values, it is possible to express each as a percentage or fraction in regard to the total sum of baseline rating scores across all criterions.

The following table provides an example of how baseline rating scores are assigned to match types:

Assignment of Baseline Rating Scores to Criterions

| Criterion | Match type | Baseline Rating Score |
|---|---|---|
| Criterion 1 | 7 | BRS(C1) |
| Criterion 2 | 4 | BRS(C2) |
| . | . | . |
| Criterion 'n' | . | . |

In the present embodiment, this completes the initial configuration process. However, in other embodiments additional steps are optionally included.

Upon completion of the initial configuration process, the model is in a position to commence the collection of data indicative of criterion responses.

System Level Overview

Figure 3:
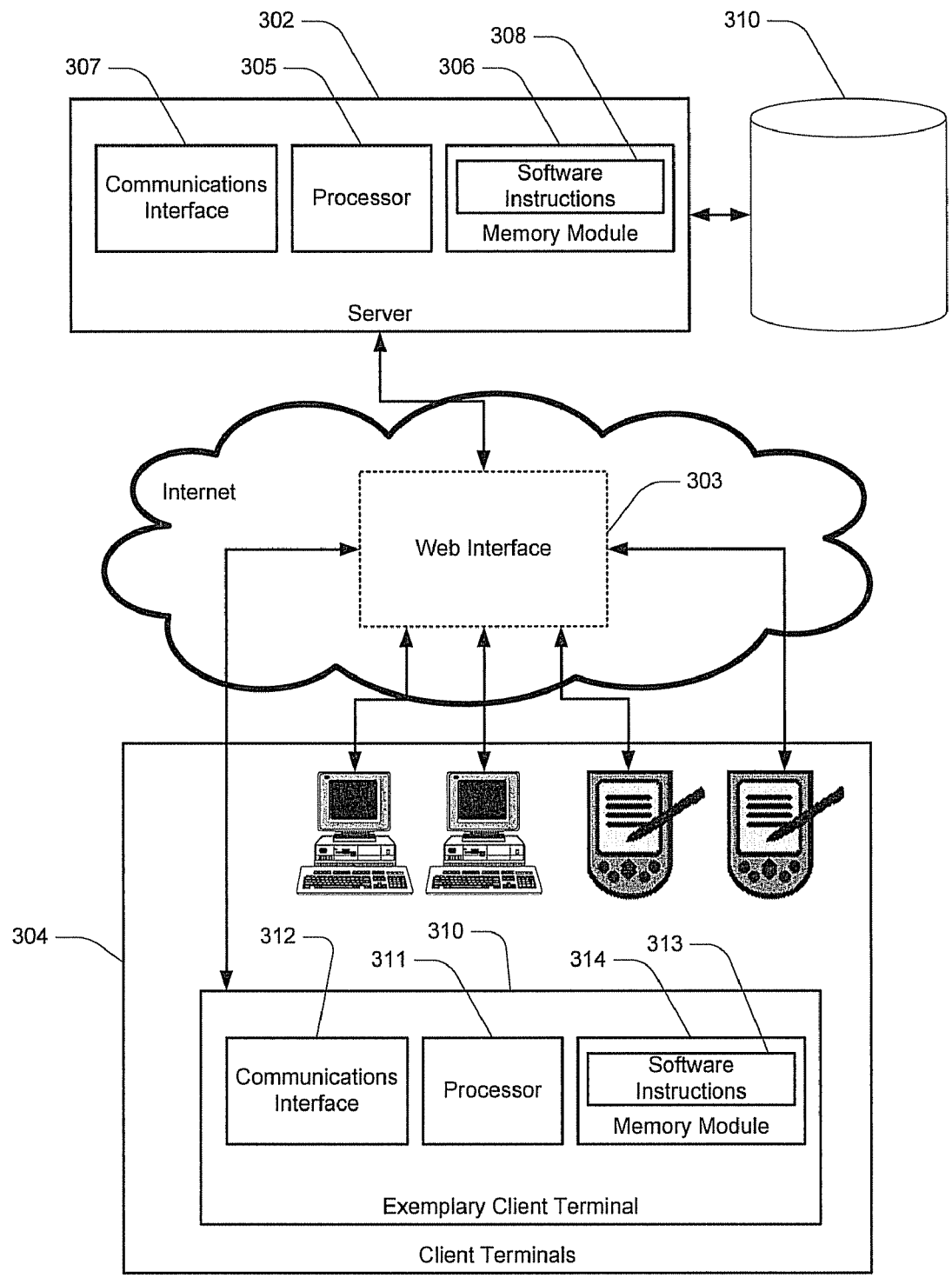
FIG. 3 is a schematic representation of a system according to one embodiment.

In the present example, the method of FIG. 1 is implemented by way of a server, as illustrated in FIG. 3. In overview, a web server 302 provides a web interface 303. This web interface is accessed by the parties by way of client terminals 304. In overview, users access interface 303 over the Internet by way of client terminals 304, which in various embodiments include the likes of personal computers, PDAs, cellular telephones, gaming consoles, and other Internet enabled devices.

Server 303 includes a processor 305 coupled to a memory module 306 and a communications interface 307, such as an Internet connection, modem, Ethernet port, wireless network card, serial port, or the like. In other embodiments distributed resources are used. For example, in one embodiment server 302 includes a plurality of distributed servers having respective storage, processing and communications resources. Memory module 306 includes software instructions 308, which are executable on processor 305.

Server 302 is coupled to a database 310, which in some embodiments includes a plurality of distributed storage locations. In further embodiments the database leverages memory module 306. Database 310 maintains a data indicative of criterions, sub-criterions, collected criterion responses, match types, baseline rating scores, and so on.

In some embodiments web interface 303 includes a website. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other embodiments proprietary software methods are implemented as an alternative. For example, in such embodiments client terminals 304 maintain software instructions for a computer program product that essentially provides access to a portal via which criterion response data and the like is able to be submitted over a network (typically the Internet) to a central location (i.e. server 302) for the purpose of bidirectional matching.

In general terms, each terminal 304 includes a processor 311 coupled to a memory module 313 and a communications interface 312, such as an internet connection, modem, Ethernet port, serial port, or the like. Memory module 313 includes software instructions 314, which are executable on processor 311. These software instructions allow terminal 304 to execute a software application, such as a proprietary application or web browser application and thereby render on-screen a user interface and allow communication with server 302. This user interface allows for the submission of the likes of data indicative of criterion responses and importance indicators.

Data Collection

As foreshadowed, method 100 includes, at step 101, collecting from the parties data indicative of criterion responses for a plurality of criterions. In this sense, the term "collecting" should be afforded a broad interpretation, including both direct collection (for example by way of the parties' interaction with a computer interface) or indirect interaction (for example where information is provided on behalf of the parties or in relation to the parties). In some embodiments the step of collecting includes a bulk collection, for example by way of importing a repository of stored data, or connecting to a database that maintains the data.

The process of collecting criterion responses, in some embodiments, includes the presentation to a party using a client terminal of one or more electronic forms for the purpose of information gathering. The forms are presented at a client terminal, filled out by the party (or on behalf of the party), and submitted electronically. The electronic form may include a wide variety of objects, including the likes of text fields, check-boxes, drop-down menus, and so on. The present concepts should not be limited to any particular form of electronic information gathering.

In overview, the electronic form or forms are configured to obtain information from a party in relation to the criterions. For example, in some embodiments a single-page form is provided for each criterion, and includes one or more questions and corresponding response objects for receiving responses to those questions. In the case of a criterion having multiple sub-criterions, the sub-criterions are optionally represented by or presented in combination with selectable check-boxes or the like.

As a preliminary step, prior to obtaining data indicative of criterion responses from a given party, it is typically necessary to identify the party and the group to which that party belongs. It will be appreciated that, although the criterions are mutually acceptable between the parties, questions submitted to elicit data indicative of criterion responses often vary from party to party. As a simple example, in the context of residential leasing, one criterion may relate to the location of a rental property. In order to elicit a criterion response from a party belonging to a group of property owners, a suitable question might be "where is the property?" However, for a party belonging to a group of renters, a suitable question might be "what is/are your preferred location/locations?" It will be appreciated that both of these questions are capable of eliciting matching responses.

Further preliminary steps are also performed in various embodiments, including the collection of identification information and the like. This information is generally not used for the purpose of bidirectional matching; rather it is used primarily for the purpose of party identification.

Once it is established to which group a party belongs, a series of one or more electronic forms is presented. In broad terms, the form or forms are completed and submitted by a party by way of a client terminal. This effectively provides to the central server data indicative of criterion responses. The data used for the purpose of matching is, in many cases, different from raw data collected. For example, check box selections may be converted into alphanumerical identifiers, and so on.

The table below is indicative of information collected during step 101.

| Collection of Criterion Responses | | |
|---|---|---|
| Party | Criterion | Criterion Response |
| Party A | Criterion 1 | Value 1 |
|  | Criterion 2 | Value 2 |
|  | Criterion 3 | Value 3 |
|  | ... |  |
|  | Criterion n | . |

It will be appreciated that this table is provided for the sake of simple illustration only.

Determination of Preferential Rating Scores

As foreshadowed, step 102 includes, in respect of at least a selection of the criterion responses, determining preferential rating scores. For the sake of the present examples, it is assumed that a preferential rating score is determined for each criterion response. However, it is by no means essential that this occur in all embodiments. For example, as noted above, in some embodiments preferential rating scores are not defined for all criterions, or not defined for a particular party in respect of one or more criterions.

In the present embodiments, the determination of a preferential rating score is based on data collected via an electronic form, similar to the collection of criterion responses discussed above. In broad terms, an electronic form provides an object for eliciting from a party an importance indicator, being an indication of the relative importance of a particular criterion. For example, this may be achieved by providing a user-interaction enabled scale ranging from lesser importance to greater importance.

Figure 4A:
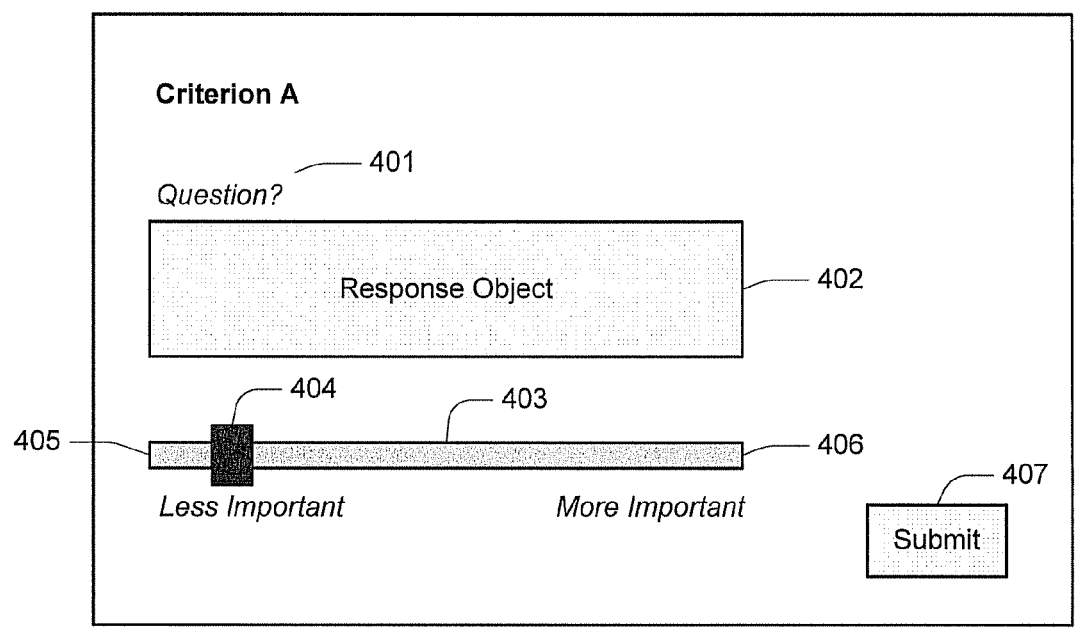
FIG. 4A is a schematic representation of a screenshot according to one embodiment.

FIG. 4A illustrates an exemplary screenshot indicative of one approach for obtaining from a user an importance indicator from which a preferential rating score is able to be determined. This screenshot shows a form for gathering a criterion response in respect of "Criterion A". A question 401 is provided, along with an object 402 for receiving the user's response to that question. A sliding scale 403 is also provided, this including a slider 404 that is able to be positioned between a lower limit 405, indicative of lesser importance, and an upper limit 406, indicative of greater importance. The user provides a response to the question, and uses slider 404 to indicate the personally perceived importance of the relevant criterion. The user then uses a submit button 407 to submit data collected via the form. Data collected via object 402 provides the relevant party's data indicative of a criterion response for the criterion under consideration. Data collected via slider 404 is used to determine the relevant party's preferential rating score in respect of the criterion under consideration, optionally expressed as a percentage.

Figure 4B:
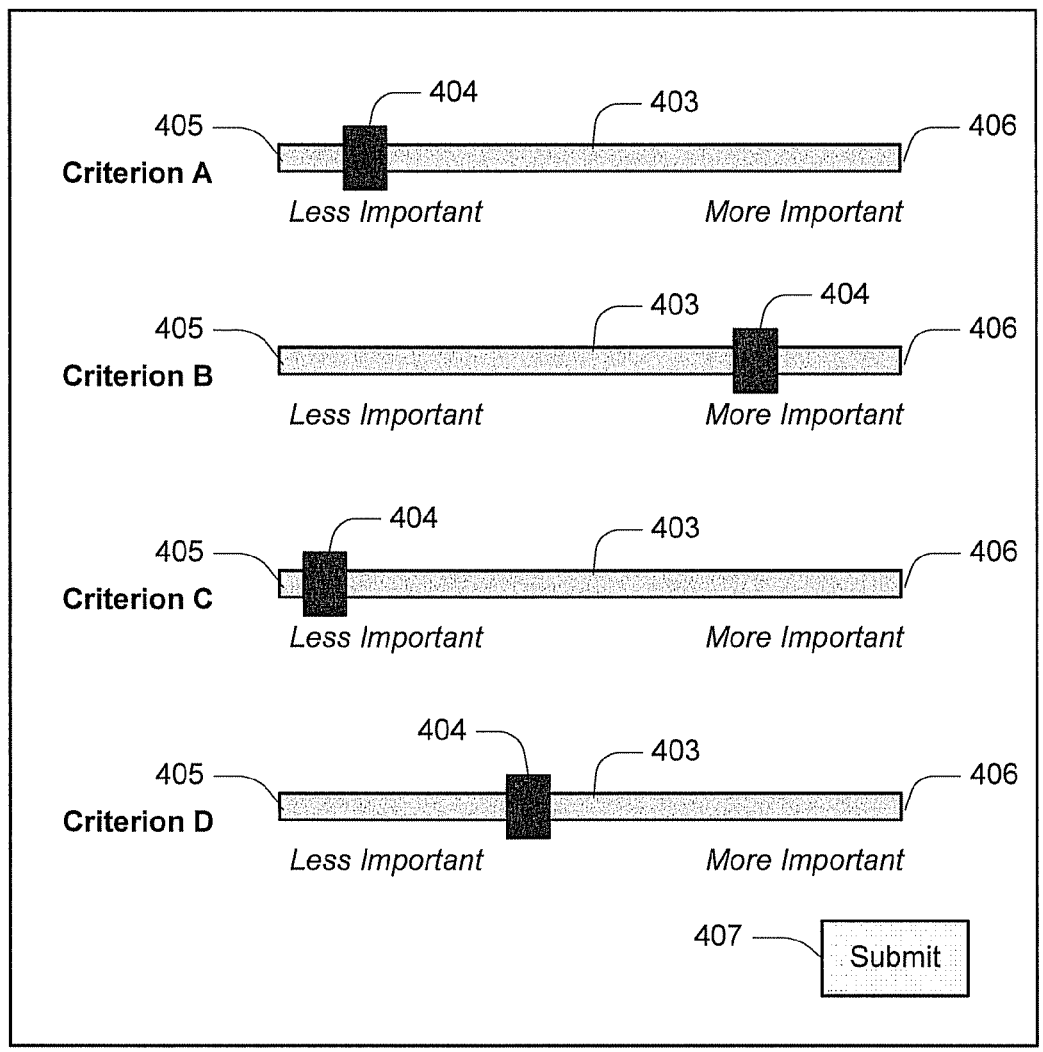
FIG. 4B is a schematic representation of a screenshot according to one embodiment.

FIG. 4B illustrates an exemplary screenshot indicative of an approach for obtaining from a user importance indicators from which a preferential rating scores are able to be determined. This may be used in combination with, or as an alternative to, the approach of FIG. 4A. In overview, this example provides a plurality of sliding scales 403, each relating to a respective criterion. It will be appreciated that such a side-by-side approach allows for more convenient relative ranking of importance between criterions.

It will be appreciated that screenshots provided herein are for the sake of illustration only, and should not be regarded as limiting in any way. Various other approaches are used for determining preferential rating scores across further embodiments. For example, the use of sliders is exemplary only, and in another embodiment a plurality of selection boxes are provided and arranged to indicate a scale from one value to another, such as are used in the context of consumer feedback forms.

The conversion of a user-provided importance indicator to a preferential rating scope is optionally based on a simple mathematical function, which is in some cases determined based on the location of a slider on its scale, and optionally converted into a percentage or fraction based on values assigned to the boundaries. In some cases the boundaries are set at 0% and 100%, whilst in other cases a reduced range is used thereby to lessen the impact to preferential rating scores in criterion matching.

Whereas baseline ratings scores are relative between criterions, preferential rating scores are in some embodiments relative between one another, or relative based on a predefined scale or scales. For example, in some embodiments they are each expressed as a percentage in view of a predefined maximum.

The table below is indicative of information collected following step 102, this time showing multiple parties belonging to a group, Group A. These parties are identified as Party A1, Party A2, and so on. Preferential rating scores are provided in a form indicative of the party (A1, A2, etc) and criterion (C1, C2, etc).

| Collation of Responses and Ratings - Group A | | | |
|---|---|---|---|
| Party | Criterion | Criterion Response | Preferential Rating Score |
| Party A1 | Criterion 1 | Value 1 | PRS(A1)(C1) |
|  | Criterion 2 | Value 2 | PRS(A1)(C2) |
|  | Criterion 3 | Value 3 | PRS(A1)(C3) |
|  | ... | . |  |
|  | Criterion n | . | PRS(A1)(Cn) |
| Party A2 | Criterion 1 | Value 1 | PRS(A2)(C1) |
|  | Criterion 2 | Value 2 | PRS(A2)(C2) |
|  | Criterion 3 | Value 3 | PRS(A2)(C3) |
|  | ... | . |  |
|  | Criterion n | . | PRS(A2)(Cn) |
| Party A3 | Criterion 1 | Value 1 | PRS(A3)(C1) |
|  | Criterion 2 | Value 2 | PRS(A3)(C2) |
|  | Criterion 3 | Value 3 | PRS(A3)(C3) |
|  | ... | . |  |
|  | Criterion n | . | PRS(A3)(Cn) |
| . | . | . | . |

A similar table is provided in respect of parties Party B1, Party B2, etc, belonging to Group B:

| Collation of Responses and Ratings - Group B | | | |
|---|---|---|---|
| Party | Criterion | Criterion Response | Preferential Rating Score |
| Party B1 | Criterion 1 | Value 1 | PRS(A1)(C1) |
|  | Criterion 2 | Value 2 | PRS(A1)(C2) |
|  | Criterion 3 | Value 3 | PRS(B1)(C3) |
|  | ... | . |  |
|  | Criterion n | . | PRS(B1)(Cn) |
| Party B2 | Criterion 1 | Value 1 | PRS(B2)(C1) |
|  | Criterion 2 | Value 2 | PRS(B2)(C2) |
|  | Criterion 3 | Value 3 | PRS(B2)(C3) |
|  | ... | . |  |
|  | Criterion n | . | PRS(B2)(Cn) |
| Party B3 | Criterion 1 | Value 1 | PRS(B3)(C1) |
|  | Criterion 2 | Value 2 | PRS(B3)(C2) |
|  | Criterion 3 | Value 3 | PRS(B3)(C3) |
|  | ... | . |  |
|  | Criterion n | . | PRS(B3)(Cn) |
| . | . | . |  |

These tables, or sets of data corresponding to some or all of the information shown in these tables, are compared by a matching engine to identify matches based on the match determination protocol. As presently used the term "matching engine" refers to an electronic process that executes on the basis of software instructions, and in doing so allows a computer system in which it executes to implement one or more steps of a matching method in accordance with the present disclosure.

As noted above, a PRS is not necessarily defined for all criterion responses. In the above example, this may be conceptualized by setting a given PRS to "1" for criterion responses where a party does not provide (e.g. is not invited to provide) data indicative of an importance indicator.

Determination of Match Ratings

As foreshadowed, step 103 includes processing the data indicative of criterion responses on the basis of a criterion match determination protocol. This allows for the identification of criterion matches between parties belonging to the first group and parties belonging to the second group. This is effectively facilitated by comparing criterion response data between the groups based on match types defined at step 204. This step is optionally performed periodically, or on demand (for example upon the enrollment of a new party). Following this, step 104 includes determining, for each criterion match, a criterion match rating based on a function of the baseline rating score and the preferential rating scores.

In some embodiments, the function of the baseline rating score and the preferential rating scores applies the latter to the former, thereby to either reduce or increase the relative weight of the former relative to other criterions. In the present examples, for a given criterion, both the preferential rating score of a party from the first group and a party from the second group are applied to the baseline rating score. In this manner the weighting is affected by the interests of both parties.

In one embodiment, where a criterion match is found, a criterion match rating (CMR) is calculated as the product of the baseline rating score (BRS), and the two parties' respective preferential rating scores (PRS). That is, for a given criterion Ci, the CMR for a match between a Party Aj and a Party Bk, is defined by:

$$CMR_{(Ci)(Aj)(Bk)} = BRS(Ci) \times PRS(Aj)(Ci) \times PRS(Bk)(Ci)$$

In other embodiments additional factors are introduced into this formula to affect weightings and/or the impact of preferential rating scores on baseline rating scores.

Individual criterion match ratings are summed for each combination of a party belonging to the first group and a party belonging to the second group to determine a total match rating (TMR) for that combination of parties. For criterions Ci, where i ranges from 1 to n, the TMR for parties Aj and Bk may be expressed as:

$$TMR_{(Aj)(Bk)} = \sum_{C1}^{Cn} CMR_{(Ci)(Aj)(Bk)}$$

As discussed in the following section, TMRs allow for the ranking of matches between parties.

Ranking of Matches

TMRs are in some embodiments used to rank matches for a given party belonging to the first group with all parties belonging to the second group (and/or vice versa). Furthermore, it is possible to define a match rating matrix as shown in the table below:

| Match Rating Matrix | | | | |
|---|---|---|---|---|
| | Party A1 | Party A2 | Party A3 | . |
| Party B1 | $TMR_{(A1)(B1)}$ | $TMR_{(A2)(B1)}$ | $TMR_{(A3)(B1)}$ | . |
| Party B2 | $TMR_{(A1)(B2)}$ | $TMR_{(A2)(B2)}$ | $TMR_{(A3)(B2)}$ | . |
| Party B3 | $TMR_{(A1)(B3)}$ | $TMR_{(A2)(B3)}$ | $TMR_{(A3)(B3)}$ | . |
| . | . | . | . | . |

From this matrix, it is technically straightforward to report for each party its matches, ordered from highest to lowest, thereby to provide an indication of compatibility with other parties. In some cases, only matches having a rating greater than a predetermined threshold are reported.

In some embodiments, parties are informed when certain matches occur. For example, a party is informed in the event a match having a total match rating above a predetermined (optionally user specified) threshold is identified. This may be by way of an electronic alert communicated by email, SMS, or other communications service. In some cases different thresholds apply for different communications services.

In general terms, the rating matrix is regularly updated. This may occur periodically, each time a party submits or modifies a profile (i.e. a profile defined by a set of criterion responses), or the like. This regular updating process allows for alerts to be provided on an ongoing basis, such that parties are informed of matches that come about over time.

Once parties are matched, additional functionalities are provided to facilitate the interfacing of these parties. For example, in some embodiments parties are able to communicate with one-another (optionally anonymously), or access may be provided to additional information (for example by way of a party profile). In some embodiments, a facility is provided for criterion-based expressions of interest. In this manner, a party is able to send a simple expression of interest by selecting the party, and identifying one or more criterions in relation to which more detailed context is required. The significance of this will be more apparent based on the teachings below in the section entitled "match reports".

In some embodiments the functionalities provided to facilitate the interfacing of parties include moderated communications. In this manner, a mediator interposes the parties, and is responsible for allowing messages to pass only upon an initial review. For example, in one embodiment a client manager represents a group of investors or investees, and monitors communications with those investors or investees. For example, in one case a client manager is made aware of a communication directed towards one of his/her investees, and selectively approves or rejects the communication. Approval may include setting a permission for future communications between those parties to be inherently approved, and copied to the client manager for his/her attention.

Example

Investment Matching

A hypothetical example is considered below, directed to the field of investment matching. In overview, one or more service providers (such as financial institutions) allow parties to create profiles, the creation of these profiles (optionally in combination with further activities) resulting in the submission of data indicative of criterion responses and allowing for the determination of preferential rating scores. The data is centrally processed (optionally having been collected from multiple service providers) thereby to allow each party to identify potential matches, either as investors looking for investment opportunities, or as parties looking for investors.

For the sake of the present example, the following criterions are defined:

| Table of Exemplary Criterions | |
|---|---|
| Criterion Number | Criterion Descriptor |
| Criterion 1 | Location |
| Criterion 2 | Industry category |
| Criterion 3 | Competitive advantage |
| Criterion 4 | Investment preference |
| Criterion 5 | Investment range |
| Criterion 6 | Investment return |
| Criterion 7 | Use of funds |
| Criterion 8 | Business stage |
| Criterion 9 | Investor involvement |
| Criterion 10 | Legal entity preference |

-continued

Table of Exemplary Criterions

| Criterion Number | Criterion Descriptor |
|---|---|
| Criterion 11 | Intellectual property |
| Criterion 12 | Exit strategy |

Sub criteria are also defined as follows:

Table of Exemplary Criterions and Sub-Criterions

| Criterion Number | Criterion Descriptor | Sub-Criterion Descriptors |
|---|---|---|
| Criterion 1 | Location | None |
| Criterion 2 | Industry category | None |
| Criterion 3 | Competitive advantage | Lower sale price, low cost of production, cheap raw material, volume of scale . . . |
| Criterion 4 | Investment preference | Debt finance: mortgage, convertible note, mezzanine debt Ownership: purchase business, purchase equity, acquire shares . . . |
| Criterion 5 | Min Investment | None |
| Criterion 6 | Max Investment | None |
| Criterion 7 | Investment return | None |
| Criterion 8 | Use of funds | Asset acquisition, expansion capital, MBO, market development, R&D . . . |
| Criterion 9 | Business Stage | Startup, early stage, first round, second round, later stage, IPO . . . |
| Criterion 10 | Investor Involvement | Full time, part time exec, mentor, non executive director . . . |
| Criterion 11 | Legal entity preference | Natural person, private company, trust, unlisted public company.. |
| Criterion 12 | Intellectual property | Patents, trademarks, registered designs, copyright, trade secrets |
| Criterion 13 | Exit strategy | Sale of equity, trade sale, merger, IPO, MBO, debt finance |

The following match types are defined:

Table of Exemplary Match Types

| Match Type | Description |
|---|---|
| 1 | Single/single |
| 2 | Single/single |
| 3 | Single/single |
| 4 | Single/multi any match |
| 5 | multi/single any match |
| 6 | Multi/multi any match |
| 7 | A contained in B |

Match types are then assigned to each criterion:

Table of Exemplary Criterion/Match Type Assignment

| Criterion Number | Criterion Descriptor | Match type |
|---|---|---|
| Criterion 1 | Location | 7 |
| Criterion 2 | Industry category | 1 |
| Criterion 3 | Competitive advantage | 6 |
| Criterion 4 | Investment preference | 4 |
| Criterion 5 | Investment min | 2 |
| Criterion 6 | Investment max | 3 |
| Criterion 7 | Investment return | 2 |
| Criterion 8 | Use of funds | 6 |
| Criterion 9 | Business stage | 5 |
| Criterion 10 | Investor involvement | 6 |
| Criterion 11 | Legal entity preference | 6 |
| Criterion 12 | Intellectual property | 6 |
| Criterion 13 | Exit strategy | 6 |

Baseline rating scores are also assigned:

Table of Exemplary Criterion/Match Type Assignment/Baseline Ratings

| Criterion Number | Criterion Descriptor | Match type | Baseline Rating Score |
|---|---|---|---|
| Criterion 1 | Location | 7 | 10 |
| Criterion 2 | Industry category | 1 | 10 |
| Criterion 3 | Competitive advantage | 6 | 5 |
| Criterion 4 | Investment preference | 4 | 2 |
| Criterion 5 | Investment min | 2 | 3 |
| Criterion 6 | Investment max | 3 | 1 |
| Criterion 7 | Investment return | 2 | 5 |
| Criterion 8 | Use of funds | 6 | 2 |
| Criterion 9 | Business stage | 5 | 5 |
| Criterion 10 | Investor involvement | 6 | 6 |
| Criterion 11 | Legal entity preference | 6 | 2 |
| Criterion 12 | Intellectual property | 6 | 4 |
| Criterion 13 | Exit strategy | 6 | 2 |

Following this, criterion responses and preferential rating scores are collected. The following table shows examples of these from two parties, A1 and A2.

Exemplary Criterion Responses/Preferential Rating Scores

| Party | Criterion Descriptor | Value | PRS |
|---|---|---|---|
| A1 | Location | Australia | 90% |
| | Industry category | Health | 100% |
| | Competitive advantage | Large market share, Experienced mgmt | 50% |
| | Investment preference | Mortgage, purchase equity | 20% |
| | Investment min | 1M | 30% |
| | Investment max | 3M | 100% |
| | Investment return | 25% | 50% |
| | Use of funds | Market Development | 100% |
| | Business Stage | Mature Business, Established business | 75% |
| | Investor Involvement | Non exec director, Mentor | 60% |
| | Legal entity preference | Natural Person | 100% |
| | Intellectual property | Patents, trademark | 10% |
| | Exit strategy | Trade Sale | 0% |
| A2 | Location | Sydney | 50% |
| | Industry category | Retail | 80% |
| | Competitive advantage | Experienced mgmt | 25% |
| | Investment preference | Mortgage, purchase equity | 60% |
| | Investment min | 500K | 10% |
| | Investment max | 1M | 100% |
| | Investment return | 20% | 80% |
| | Use of funds | Market Development | 80% |
| | Business Stage | Mature Business, Established business | 50% |
| | Investor Involvement | Non exec director, Mentor | 100% |
| | Legal entity preference | Natural Person | 100% |
| | Intellectual property | None | 0% |
| . | . | . | . |

Scoring is then preformed, as discussed above, allowing for the formation of the following matrix:

Exemplary Rating Matrix

|  | Party A1 | Party A2 | Party A3 | . |
|---|---|---|---|---|
| Party B1 | $TMR_{(A1)(B1)}$ | $TMR_{(A2)(B1)}$ | $TMR_{(A3)(B1)}$ | . |
| Party B2 | $TMR_{(A1)(B2)}$ | $TMR_{(A2)(B2)}$ | $TMR_{(A3)(B2)}$ | . |
| Party B3 | $TMR_{(A1)(B3)}$ | $TMR_{(A2)(B3)}$ | $TMR_{(A3)(B3)}$ | . |
| . | . | . | . | . |

From here, it is possible to report to the individual parties in relation to potentially suitable matches, and optionally facilitate further steps in the development of relationships between pairs of parties.

Dynamic Adjustment of Baseline Ratings

As foreshadowed, in some embodiments baseline ratings are dynamically adjusted. For example, some embodiments including the step of adjusting one or more of the baseline rating scores periodically responsive to data indicative of importance indications collected from the parties.

In overview, the relevance or importance of one or more criterions may change in response to market conditions To account for this, various embodiments implement one or more of the following approaches to dynamically adjust baseline ratings:

Periodic manual review based on assessment of market factors. For example, if stock in a certain location dropped to very low levels, a baseline rating score for a location criterion could be reduced, thereby generating a higher number of matches in the remaining (n−1) dimensions.

Automated review based on preferential rating scores. In situations where preferential rating scores are consistently low or high, a feedback mechanism is optionally defined thereby to correspondingly decrease or increase baseline rating scores. For example, in some embodiments baseline rating scores are influenced by preferential rating scores by way of a selected optimization technique, which optionally considers average or aggregate values for one or more preferential rating scores over a given time period. In one example, one or more baseline rating scores are initially to a zero value (or alternately a maximum value or intermediate reference value), and dynamically adjusted over time responsive to preferential rating scores. Such an approach optionally provides an alternative for initially experientially defining such baseline rating scores.

Periodic manual review based on assessment of match patterns. Match patterns may be analyzed, for example in terms of cluster graphs or the like. This can be used to identify particular "hot-spots" within a given market (or, for that matter, "cold-spots"). Baseline rating scores are optionally adjusted (optionally on the basis of forward modeling) based on an understanding such analysis.

It will be appreciated that such approaches may be used to further increase the likelihood of appropriate matches being identified.

Suggestive Feedback

In some embodiments, a suggestive feedback mechanism is provided to provide to a party insights into how more matches might be found. For example, one approach is to simulate additional virtual parties corresponding to an actual party, these being based on the same criterion responses, but different preferential rating scores. The number of simulations, and nature of variations between simulations, varies between embodiments, and is in some cases subject to market knowledge and/or processing resources. Such simulations are able to identify situations where the number of high-rating matches for a given party would be increased by virtue of different preferential rating scores. Feedback is then provided, optionally being phrased in terms of "if importance on Criterion X were reduced, then X additional matches would be identified".

In further embodiments, simulations are based on the variation of factors other than preferential rating scores. For example, in some cases criterion responses are varied. This is optionally performed on the basis of a criterion response adjustment protocol. Such a protocol allows the adjustment of criterion response based on a set of rules thereby adjust an existing criterion response to provide a similar criterion response. The process may be algorithmic or subjective. In some cases it includes broadening a criterion response (for example widening a location value to include surrounding locations). In other cases it includes the exchanging of sub-criterion selections or values (for example, exchanging a desire to be an "executive director" with a desire to be an "active business partner", assuming these are predefined to be "similar" in the context of the criterion response adjustment protocol). The general underlying objective is to allow incremental adjustment of response values without significantly departing from core values underlying a party's desires.

Restricted Advertising

In some embodiments, not all of a given party's matches are made known to that party, regardless of whether the total match ratings are greater than a predefined threshold. One example of this is present in the context of a tiered advertising protocol. In overview, parties belonging to either or both groups are assigned to tiers, and matches are only advertised to the parties where particular tier-based conditions are satisfied. A specific example of tiered advertising is provided below, in the context of investor/investee matching.

In this example, investors are assigned to tiers. For instance, these might be "Tier A" for high net worth, high liquidity investors (or otherwise "special" clients of an investment facilitator agency), "Tier B" below Tier A, for investors having important characteristics, but less so that Tier A, and Tier C for all remaining investors. Default rules are considered such that opportunities (i.e. matches between investors and investees) are only advertised to investors, and only advertised to investors based on tier-based conditions. For example, matches are advertised only to Tier A investors for a first period of time (typically in the order of days or weeks), then only to Tier A or B investors for a second period of time (again typically in the order of days or weeks), then to all investors (including Tier A, Tier B and Tier C investors). These default rules are optionally modified on an investee-by-investee basis. For example, a human administrator reviews all investee profiles upon creation, and optionally modifies the default rules.

Match Reports

In some embodiments, a party is able to review more detail of a particular match by way of a match report. Such a report provides further context in terms of how a total match rating has been calculated. An exemplary report is provided in FIG. 5.

In the exemplary report of FIG. 5, a row is provided for each criterion, with criterion descriptions being provided in the first column. The other columns show, moving from left to right:

Whether or not there was a match (true for a match, false for no match).

The baseline rating score.

The baseline rating score as adjusted by the investor's preferential rating score. Where the investor does not provide an importance indicator, this is the same as the baseline rating score.

The baseline rating score as adjusted by the investee's preferential rating score. Where the investee does not provide an importance indicator, this is the same as the baseline rating score.

A total match score, being 73.16 in this example.

From this report, it is possible to more fully understand the reasons for which a match is scored in a particular manner, and may lead the parties to delve into issues concerning specific criterions.

Public Platform Publishing

In one investment-related embodiment, an "abstract" is prepared (manually or autonomously) in respect of each investee. This abstract describes the opportunity, but does not identify the investee.

By default, investee information is only made available to investors via a secure facility which hosts the bidirectional matching functionalities. In this regard, interactions between investors and investees can be closely regulated, for the protection of both parties. However, there are situations where such safeguards are less beneficial, and perhaps a hindrance, such as insolvencies (which should be advertised to a wider market). For example, in some cases local laws provide an obligation to publish insolvencies.

In one embodiment, insolvencies (and optionally other opportunities submitted by or on behalf of investees) are afforded special treatment. Specifically, such opportunities are marked, and their respective abstracts made available for public viewing on a web page. In this manner, such opportunities may be identified by third parties by web browsing (e.g. following the use of a search engine). Upon viewing an abstract a given third party is directed to the secure facility and invited to register, should more detailed information be desired. In this manner, interactions are still able to be regulated, although opportunities are advertised to a wider audience.

Application to Unidirectional Matching

Although embodiments described herein are predominately directed to bidirectional matching, some embodiments find application in the context of unidirectional matching. This is particularly the case in respect of the use of a baseline rating score in combination with a preferential rating score. For example, one embodiment provides a searching method including:

(a) Receiving data indicative of a plurality of search terms. For example, these may take the form of keywords.

(b) Assigning to each search term a baseline rating score. In one embodiment the baseline rating scores are of constant value for all search terms. In another embodiment, the search terms are provided in an order, and the baseline rating scores decrease along the order such that an earlier provided search term receives a higher baseline score than a later provided search term.

(c) In respect of at least one search term, determining a preferential rating score. For example, sliders such as those shown in FIG. 4B are provided for allowing a user to provide a performance indicator in respect of one or more (or each) of the search terms.

(d) On the basis of a result identification protocol, processing the data indicative of search terms, thereby to identify search results. This may leverage many existing searching technologies.

Determining, for each search result, a result rating based on a function of the baseline rating scores and the preferential rating scores.

It will be appreciated that such an approach allows for additional user control over searching.

Conclusions

It will be appreciated that the disclosure above provides various significant systems and methods for bidirectional matching. In particular, the use of a multi-level importance weighting procedure increases the reliability of match identification. Various other features and functionalities described provide additional increases in the reliability, efficiency, and overall commercial value of such systems and methods.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer implemented method for bidirectional matching between a plurality of parties belonging to a first group and a plurality of parties belonging to a second group, the method comprising:
   (a) operating a processor thereby to collect, from each party belonging to the first group, data indicative of first group criterion responses for a plurality of criterions, wherein each criterion has a pre-assigned baseline rating score;
   (b) operating the processor thereby to determine, in respect of at least a selection of the first group criterion responses, first group preferential rating scores;
   (c) operating the processor thereby to collect, from each party belonging to the second group, data indicative of second group criterion responses for the plurality of criterions;
   (d) operating the processor thereby to determine, in respect of at least a selection of the second group criterion responses, second group preferential rating scores;
   (e) on the basis of a criterion match determination protocol, operating the processor thereby to process the data indicative of criterion responses, thereby to identify criterion matches between parties belonging to the first group and parties belonging to the second group;
   (f) operating the processor thereby to determine, for each criterion match between a party belonging to the first group and a party belonging to the second group, a criterion match rating based on a function of the baseline rating score and, where determined, the first group preferential rating score, the second group preferential rating score, or the first group preferential rating score and the second group preferential rating score in combination; and
   (g) operating the processor thereby to calculate, in respect of a match between a given party belonging to the first group and a given party belonging to the second group, a total match rating, wherein the total match rating is calculated based on criterion match ratings determined for criterion matches between the given party belonging to the first group and the given party belonging to the second group, including at least one criterion match rating based on a first group preferential rating score and at least one criterion match rating based on a second group preferential rating score.

2. A method according to claim 1 wherein each criterion has an assigned match type, and wherein the match determination protocol is responsive to the assigned match type for each criterion.

3. A method according to claim 2 wherein each pre-assigned baseline rating score is associated with a match type for the relevant criterion.

4. A method according to claim 1 wherein one or more of the criterions includes a plurality of sub-criterions, and wherein the match types include match types that define single/single, multiple/multiple and/or single/multiple matches between sub-criterions.

5. A method according to claim 1 wherein determining a total match rating comprises operating the processor to sum the criterion match ratings.

6. A method according to claim 1 comprising, for a given party, on the basis of the total match ratings between that party and a plurality of parties belonging to the other group, operating the processor to determine a number of potential matches.

7. A method according to claim 6 comprising operating the processor to run one or more simulations thereby to identify a further one or more numbers of potential matches for that given party based on one or more adjustments of one or more factors.

8. A method according to claim 7 including a step of providing suggestive feedback on the basis of at least one of the simulations.

9. A method according to claim 7 wherein the one or more factors include one or more of that party's preferential rating scores.

10. A method according to claim 7 wherein the one or more factors include one or more of that party's criterion responses.

11. A method according to claim 10 wherein the one or more of that party's criterion responses are adjusted on the basis of a criterion response adjustment protocol.

12. A method according to claim 1 comprising, on the basis of the criterion match ratings, operating the processor to rank party-to-party matches between a given party belonging to the first group and a plurality of parties belonging to the second group.

13. A method according to claim 1 wherein the baseline rating scores are relative between criterions across the decision set and wherein the preferential rating scores are relative with respect to a predefined frame of reference.

14. A method according to claim 1 wherein the function of the baseline rating score and the preferential rating score or scores varies the baseline rating score to account for personal circumstances reflected by the preferential rating score or scores.

15. A method according to claim 1 comprising operating the processor to adjust one or more of the baseline rating scores periodically responsive to data indicative of importance indications collected from the parties.

16. A computer implemented method for bidirectional matching between a plurality of parties belonging to a first group and a plurality of parties belonging to a second group, the method comprising including:
   (a) operating a processor to receive, from each party belonging to the first group, data indicative of first group criterion responses for each criterion in a decision set, the decision set including a plurality of criterions having respective first group baseline rating scores, wherein at least a selection of the first group criterion responses include data indicative of a first group importance indicator;
   (b) operating the processor to process the data indicative of first group importance indicators thereby to define first group preferential rating scores;
   (c) operating the processor to receive, from each party belonging to the second group, data indicative of second group criterion responses for each criterion in the decision set, the decision set including a plurality of criterions having respective second group baseline rating scores, wherein at least a selection of the second group criterion responses include data indicative of a second group importance indicator;
   (d) operating the processor to process the data indicative of second group importance indicators thereby to define second group preferential rating scores;
   (e) on the basis of a criterion match determination protocol, operating the processor to process the data indicative of criterion responses, thereby to identify criterion matches between parties belonging to the first group and parties belonging to the second group;
   (f) for each identified criterion match between a first party belonging to the first group and a second party belonging to the second group, operating the processor to calculate a criterion match score based on a function of the first group baseline rating score, where defined, the first group preferential rating score, the second group baseline rating score, where defined, and the second group preferential rating score; and
   (g) on the basis of the scoring of criterion matches, operating the processor to rank party-to-party matches between a given member of the first group and a plurality of members of the second group;
   (h) operating the processor thereby to calculate, in respect of a match between a given party belonging to the first group and a given party belonging to the second group, a total match rating, wherein the total match rating is calculated based on criterion match scores determined for criterion matches between the given party belonging to the first group and the given party belonging to the second group, including at least one criterion match score based on a first group preferential rating score and at least one criterion match score based on a second group preferential rating score.

17. A computer implemented method for information gathering thereby to allow bidirectional matching between a plurality of parties belonging to a first group and a plurality of parties belonging to a second group, the method comprising:
   a) operating the processor to present, to a first party, an interface for collecting data indicative of first group criterion responses for a plurality of criterions, wherein each criterion has an assigned first group baseline rating score;
   (b) operating the processor to receive, from the first party, data indicative of the first group criterion responses for the plurality of criterions;
   (c) operating the processor to receive, from the first party, in respect of at least one criterion response, data indicative of a first group importance indicator;
   (d) operating the processor to present, to a second party, an interface for collecting data indicative of second group criterion responses for a plurality of criterions, wherein each criterion has an assigned second group baseline rating score;
   (e) operating the processor to receive, from the second party, data indicative of the second group criterion responses for the plurality of criterions;
   (f) operating the processor to receive, from the second party, in respect of at least one criterion response, data indicative of a second group importance indicator;
   (g) operating the processor to process each received first group importance indicator thereby to define preferential rating scores for the relevant first criterion responses and to process each received second group importance indicator thereby to define preferential rating scores for the relevant second group criterion responses;
   (h) on the basis of a criterion match determination protocol, operating the processor to process the data indicative of criterion responses, thereby to identify criterion matches between parties belonging to the first group and parties belonging to the second group; wherein the matching includes calculating a criterion match score based on a function of the baseline rating scores and, where defined, the preferential rating scores;
   (i) operating the processor thereby to calculate, in respect of a match between a given party belonging to the first group and a given party belonging to the second group, a total match rating, wherein the total match rating is calculated based on criterion match scores determined for criterion matches between the given party belonging to the first group and the given party belonging to the second group, including at least one criterion match score based on a first group preferential rating score and at least one criterion match score based on a second group preferential rating score.

* * * * *